United States Patent Office 3,324,079
Patented June 6, 1967

3,324,079
VINYLMETHOXYPOLYSILOXANE
David P. Spalding, Troy, N.Y., assignor to General
Electric Company, a corporation of New York
No Drawing. Filed July 5, 1963, Ser. No. 293,139
1 Claim. (Cl. 260—46.5)

This invention is concerned with certain novel silicone compositions. More particularly, this invention relates to certain silicone compositions which are useful in imparting water-repellent coatings to treated surfaces, which water-repellent coatings gradually disappear or wear off when subjected to atmospheric weathering.

The use of organopolysiloxanes for rendering various materials water-repellent is well known in the art. Illustrative of the many types of materials which have been used for this purpose are organochlorosilanes, such as various methylchlorosilanes, various silicone resins, and the moisture unstable methylmethoxypolysilanes described in Patent 2,810,704—Krantz. While all of these materials are quite satisfactory for rendering surfaces water-repellent, the water repellency is sometimes more permanent in character than desired. For example, in certain applications, it is desired to render a surface water-repellent during a manufacturing process and thereafter to have the treated surface converted from the water-repellant state to a non-water-repellent state.

The present invention is based on my discovery of a specific class of organopolysiloxanes which can be used to render surfaces water-repellent with the water-repellent surfaces gradually losing their water-repellent character upon exposure to atmospheric weathering. This property is particularly desirable in applications such as the preparation of white roofing granules to be used in the production of bituminous roll roofing and asphalt roofing shingles.

As pointed out in Patent 2,595,465—Keen et al. with the advent of colored roofing granules, it became necessary to apply a water-repellent coating to the granules to prevent water from dissolving water-soluble coloring material on the granules and thereby loosening the granules and causing them to come loose from the asphalt bases in which they were imbedded. By the application of silicone coatings derived from alkyl, aryl, alkoxy and aryloxy silanes to these granules, the problem of adhesion of granules to the asphalt base was solved.

While the silicone treatments of the type described in the aforementioned Keene et al. patent solved the problems encountered with most colored roofing granules, the increasing use of white roofing granules has presented a new problem. Because of the permanent coating of the hydrophobic silicone derivative on the white roofing granules, the granules remain in their water-repellent and organophilic state during the service life of asphalt singles prepared therefrom. While this property is very desirable from the viewpoint of the permanent adhesion of the granules to the asphalt base, it is found that the nature of the silicone coatings employed is such that the organic portion of the silicone coating, i.e., the alkyl, aryl, alkoxy or aryloxy group, tends to react with air-borne organic materials. More particularly, the coated roofing granules of the prior art tend to react with organic materials from industrial furnaces and home chimneys and the like. With colored roofing granules, this produces no significantly noticeable defect. However, with white roofing granules, a noticeable "sooting" or darkening of the surface of the granules occurs during the service life.

The specific class of organopolysiloxanes of my invention can be used to impart a hydrophobic or organophilic coating to white roofing granules sufficient to provide the desired adhesion between the roofing granules and asphalt bases over the service life of asphalt shingles, but which coating, in areas exposed to atmospheric weathering, rapidly deteriorates so as to convert the exposed surfaces of the roofing granules to an organophilic state, whereby the exposed surfaces of the granules no longer react with air-borne organic materials and do not exhibit the tendency to soot or discolor. The specific compositions of my invention are vinylmethxypolysiloxanes having the formula:

(1) 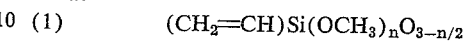
$$(CH_2=CH)Si(OCH_3)_nO_{3-n/2}$$

where $n$ has a value of from about 0.15 to 0.5.

The vinylmethoxypolysiloxanes of the present invention are prepared by the methanolysis of vinyltrichlorosilane, the partial hydrolysis and condensation of the methanolysis product and the neutralization of the final product. More particularly, a solution is formed of vinyltrichlorosilane in a suitable solvent, e.g., an aromatic solvent. Thereafter, the aromatic solvent solution of vinyltrichlorosilane is added to substantially pure methanol or to methanol which is saturated with hydrogen chloride. Where substantially pure methanol is employed, the solution soon becomes saturated with hydrogen chloride since hydrogen chloride is generated by the reaction between methanol and the vinyltrichlorosilane. The net result of this reaction is to replace some or most of the silicon-bonded chlorine atoms of the vinyltrichlorosilane with silicon-bonded methoxy groups. This reaction mixture is then mixed with a mixture of water and methanol to complete the methanolysis and the water present serves to replace any remaining silicon-bonded chlorine atoms with silicon-bonded hydroxyl groups which condense to form siloxane linkages. The water present will also tend to react with some of the silicon-bonded methoxy groups, to generate methanol and form other silicon-bonded hydroxy groups which also condense to form siloxane linkages. After treatment with the aqueous methanol solution, the resulting mixture separates into two layers, the upper layer being hydrogen chloride dissolved in methanol and the lower layer being a solution of a vinylmethoxypolysiloxane in the aromatic solvent employed. This polysiloxane layer is separated and neutralized with a suitable neutralizing agent to produce the product of the present invention.

In preparing the solution of the vinyltrichlorosilane with the aromatic solvent, it is advantageous to employ, on a weight basis, from 0.1 to 0.3 part of the solvent per part of the vinyltrichlorosilane. The solvent used in making the vinyltrichlorosilane solution is preferably an aromatic hydrocarbon, since aromatic hydrocarbons have relatively high densities which favor the easier separation of the multiple phases generated in my process. It is, however, possible to prepare the products of the present invention from halogenated aliphatic solvents such as trichloroethylene, carbon tetrachloride or other suitable chlorinated hydrocarbons.

The preferred solvents as previously described are the aromatic hydrocarbon solvents and it is desirable to employ a solvent having a flash point above 30° C. but at the same time low enough so that the solvent will evaporate from a solution of the solvent and the vinylmethoxypolysiloxanes of the present invention upon application of a solution of these materials to the surface to be treated. Preferably, the boiling point range of the aromatic solvent is from about 140 to 190° C.

Among the aromatic solvents which can be employed with the vinyltrichlorosilane can be mentioned, for example, benzene, toluene, xylene, and various other alkylated aromatic materials such as ethyl benzene, hydrogenated naphthalene, etc.

One group of solvent which has been found eminently suitable for use in the practice of the present invention are mixtures of alkylated aromatic hydrocarbons obtained by the cracking and hydroforming and subsequent distillation of light petroleum oils, particularly mixtures of alkylated benzenes sold under the name of Solvessos, and more particularly described in the booklet entitled "Esso Petroleum Solvents" published by Esso Standard Oil Company (1951). A typical Solvesso hydrocarbon fraction is Solvesso 100, which contains 3 percent m-xylene, 6 percent o-xylene, 3 percent isopropyl benzene, 20 percent 1-methyl-3-ethyl benzene, 8 percent 1-methyl-4-ethyl benzene, 7 percent 1,3,5-trimethyl benzene, 8 percent 1-methyl-2-ethyl benzene, 27 percent 1,2,4-trimethyl benzene, 5 percent 1,2,3-trimethyl benzene and 13 percent of other monoalkyl benzenes.

Other solvents which can be employed in the practice of my invention are, for example, those products described as "Hi Flash Naphtha" which is a mixture of alkylated aromatic hydrocarbons obtained from coal tar. Generally, the boiling point of these mixtures will range from about 135 to 195° C., depending upon the specific mixture. For example, one mixture can have a boiling range of from 140 to 180° C. while another can have a range of from about 150 to 175° C. Examples of alkylated aromatic compounds derived from the distillation of light petroleum oils are the aforementioned liquids identified as Solvessos, which have boiling point ranges somewhere between about 90° C. to 240° C. and Solvent Naphtha, which is a narrow cut boiling between about 135 to 155° C.

After forming the aromatic solvent solutions of the vinyltrichlorosilane, this solution is first reacted with methanol, preferably methanol saturated with HCl, and then reacted with a methanol-water solution. The total amount of methanol used in the entire reaction involving these two steps is from 1 to 3 or more moles of methanol per mole of vinyltrichlorosilane present in the aromatic solvent solution. In the first step, approximately 50 to 75 percent of the total methanol is used as methanol saturated with hydrogen chloride. The aromatic solvent solution of the vinyltrichlorosilane is slowly added to the methanol-HCl solution with agitation and the endothermic reaction between the methanol and the vinyltrichlorosilane causes a temperature of the reaction mixture to drop to about 0° C. or below, during which reaction hydrogen chloride gas is evolved from the reaction mixture. Upon completion of hydrogen chloride evolution, the remaining methanol is added as a solution of methanol and water. The amount of water present in the water-methanol solution is carefully controlled so as to provide the desired degree of hydrolysis and condensation. In general, it is found that the amount of water used should range from about 0.14 to 0.19 part per part of vinyltrichlorosilane initially employed. This amount of water corresponds to about 1.3 to 1.7 moles of water per mole of vinyltrichlorosilane initially employed. During the addition of the water-methanol solution to the reaction mixture, the temperature of the reaction mixture will rise and hydrogen chloride is evolved. After completion of the addition of the methanol-water mixture, the resulting reaction mixture is allowed to separate into two layers. The lower layer is separated and washed with methanol and then neutralized by the addition of calcium carbonate. The neutralized reaction mixture is then heated under reduced pressure to remove residual methanol using a temperature of from about 50 to 70° C. and a pressure of about 20 to 75 millimeters. After cooling, the reaction mixture is then filtered, preferably in the presence of a suitable filter aid, to remove the neutralizing agent and the solids concentration is adjusted by the addition of necessary aromatic solvent to produce a vinylmethoxypolysiloxane within the scope of Formula 1 as a 50 to 75 percent solids solution. The molecular weight of this material will be in the range of from about 2,000 to 10,000, producing solution viscosities of approximately 15 to 100 centipoises in 50 to 75 percent solutions at 25° C.

The following examples are illustrative of the practice of my invention and are not for purposes of limitation. All parts are by weight.

*Example 1*

A solution was prepared of 88.4 parts vinyltrichlorosilane and 11.6 parts Solvesso 100. This solution was added with stirring to methanol saturated with anhydrous hydrogen chloride. The methanol-hydrogen chloride solution contained 33.1 parts methanol and 8.3 parts anhydrous hydrogen chloride. During the addition, the temperature of the reaction mixture dropped to slightly below 0° C. To the resulting reaction mixture was added a solution of 14.8 parts methanol and 15.4 parts water, during which time the temperature of the reaction mixture rose to about 20° C. with hydrogen chloride evolution. The reaction mixture was then allowed to settle into two layers, the upper layer was removed and discarded and the lower layer was washed with 16.5 parts methanol by adding methanol, stirring the reaction mixture and then allowing the reaction mixture to again settle into two layers. The lower layer which contained the crude product of the present invention was separated off, and one part of calcium carbonate was added with agitation. The reaction mixture was then heated to 60° C. at a pressure of 30 millimeters and held at this temperature for ½ hour to remove residual methanol. The reaction mixture was then cooled, filtered in the presence of 0.5 part of a diatomaceous earth filter aid to remove solids resulting from the neutralization and 15 parts of Solvesso 100 was added to provide a 70 percent solution in Solvesso 100 of a vinylmethoxypolysiloxane having the formula

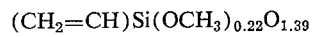

$$(CH_2=CH)Si(OCH_3)_{0.22}O_{1.39}$$

This product was substantially free of silicon-bonded hydroxyl groups, had a molecular weight of about 4,000 and the viscosity of the Solvesso solution was approximately 30 centipoises at 25° C.

*Example 2*

When the procedure of Example 1 is repeated except that the amount of water used during the reaction is 12.8 parts instead of the 15.4 parts of Example 1, the resulting vinylmethoxypolysiloxane has the formula:

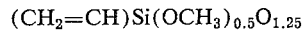

$$(CH_2=CH)Si(OCH_3)_{0.5}O_{1.25}$$

*Example 3*

When the procedure of Example 1 is repeated except that the amount of water employed during the course of the reaction is 16.7 parts instead of the 15.4 parts of Example 1, the resulting vinylmethoxypolysiloxane has the formula: $(CH_2=CH)Si(OCH_3)_{0.15}O_{1.425}$.

*Example 4*

This example illustrates the use of the vinylmethoxypolysiloxanes of the present invention in the coating of white roofing granules and compares the products so obtained with products obtained with slightly different coating materials. The roofing granules employed in this example are prepared by crushing 100 parts of taprock and mixing the crushed rock with the suspension of 1 part finely divided titania pigment and 1 part kaolin in 6 parts sodium silicate, pre-drying the coated granules at about 225° F. in a kiln and then further drying and firing the coating granules at a temperature of about 500° F. in a rotary kiln. As the fired particles leave the kiln, they are cooled to a temperature of about 175° C., and sprayed with a solution prepared by dissolving 100 parts of the aromatic solution of the vinylmethoxypolysiloxane of Example 1 in 1400 parts of a slate oil. The slate oil is a hydrocarbon oil having an A.P.I. gravity of 26; S.U. viscosity at 100° F. of 312 and a 212° F. of 51.5 seconds; flash test of 430° F.; fire test of 485° F. and pour test of 20° F. The solution is applied to the granules in an amount sufficient to provide about 5 pounds of slate oil and one quarter pound of the vinylmethoxypolysiloxane per ton of granules. The elevated temperatures of the granules causes evaporation of the aromatic solvent (Solvesso 100) and curing of the vinylmethoxypolysiloxane to form a water-repellent organophilic coating on the white granules without any significant change in their appearance. The granules thus treated are found to be readily wet by heated asphalt and asphalt shingles containing the coated white roofing granules are prepared by conventional techniques. Upon exposure to atmospheric conditions for six months in an atmosphere heavily laden with organic material from industrial furnaces leaves the shingles thus prepared unaffected. No discoloration or "sooting" occurs and moisture in the atmosphere and rain fail to dislodge the granules from the asphalt base.

Following the procedure of Example 1 of Patent 2,810,704—Krantz, a methylmethoxypolysiloxane having the formula: $(CH_3)Si(OCH_3)_{0.4}O_{1.3}$, was prepared as a 70 percent solids solution in Solvesso 100. One hundred parts of this methylmethoxypolysiloxane solution was mixed with 1400 parts of the slate oil described above and white roofing granules were prepared and asphalt shingles were made from the roofing granules as described above. When these asphalt shingles were subjected to the same weathering test described above for the asphalt shingles containing the vinylmethoxypolysiloxane coated granules, the white granules were significantly discolored at the end of the six month evaluation period. This result was totally unexpected and could not be predicted from the nature of the two methoxypolysiloxanes evaluated in the test.

In addition to employing the vinylmethoxypolysiloxanes of the present invention as coating for roofing granules, these materials are useful for imparting water repellency to many other solid and particulate materials. Where the coating is to be employed in an environment not subject to atmospheric weathering, the coating will remain intact indefinitely. On the other hand, when the surface is subjected to atmospheric weathering, the coated article is converted from a hydrophobic state to a hydrophilic state after prolonged exposure to atmospheric conditions.

What I claim as new and desire to secure by Letters Patent of the United States is:

A vinylmethoxypolysiloxane consisting essentially of repeating units of the formula:

$$(CH_2=CH)Si(OCH_3)_nO_{3-n/2}$$

where $n$ has a value of from 0.15 to 0.5.

References Cited
UNITED STATES PATENTS 2,927,910    3/1960    Cooper _____ 260—46.5
3,187,033    6/1965    Nitzsche et al. _____ 260—46.5

DONALD E. CZAJA, *Primary Examiner.*

LEON J. BERCOVITZ, SAMUEL H. BLECH,
*Examiners.*

M. MARQUIS, *Assistant Examiner.*